UNITED STATES PATENT OFFICE.

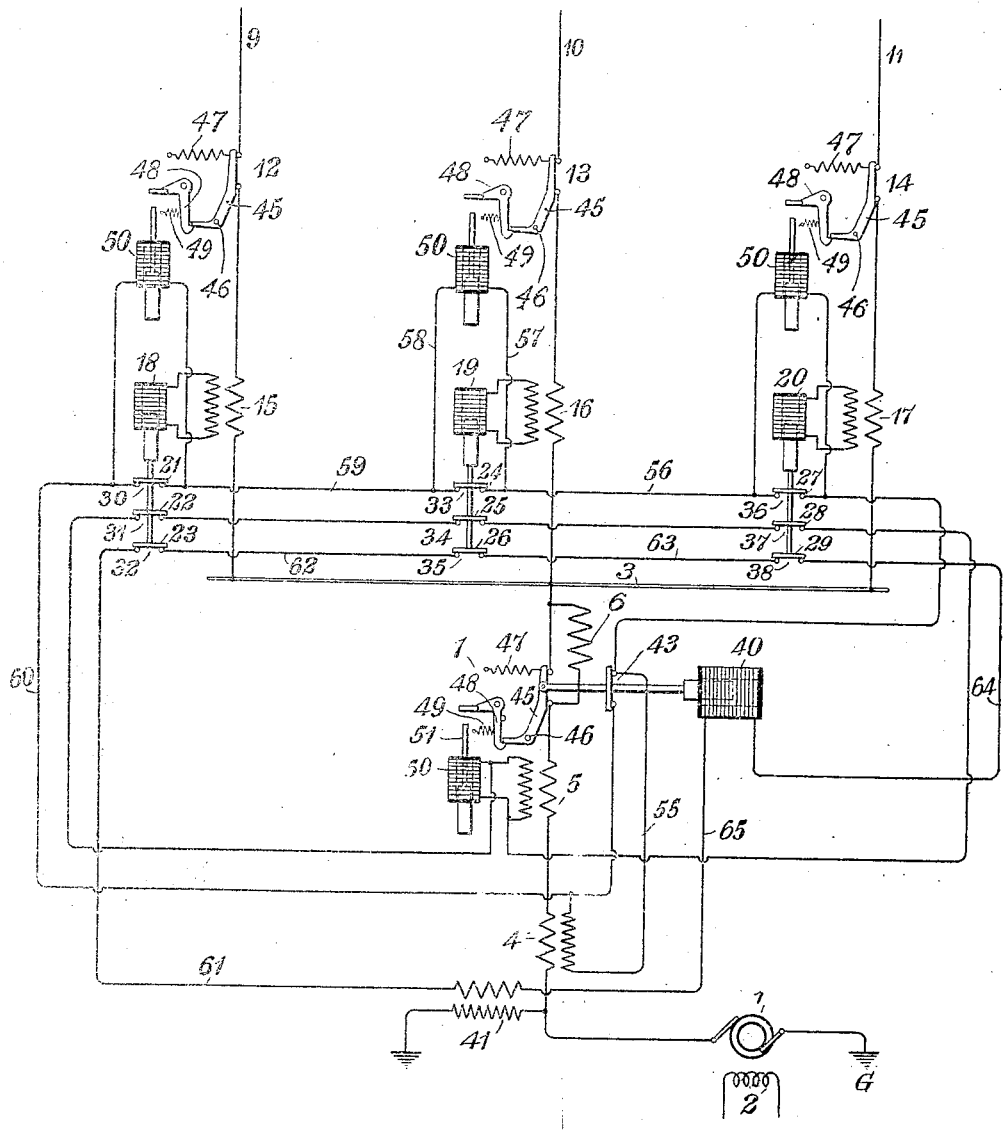

FORD W. HARRIS, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF ELECTRICAL DISTRIBUTION.

1,159,936.  Specification of Letters Patent.  Patented Nov. 9, 1915.

Application filed September 6, 1910. Serial No. 580,770.

*To all whom it may concern:*

Be it known that I, FORD W. HARRIS, a citizen of the United States, and a resident of Wilkinsburg, in the county of Allegheny and State of Pennsylvania, have invented a new and useful Improvement in Systems of Electrical Distribution, of which the following is a specification.

My invention relates to systems of electrical distribution for alternating current and it has special reference to such systems as are adapted to supply energy from a common distributing bus-bar to a plurality of feeder circuits of an electric railway or similar system.

The object of my invention is to provide a distribution system, of the above-indicated class, that shall embody automatic means for cutting out any feeder circuit under predetermined abnormal circuit conditions, such as a ground, a short-circuit or a severe overload.

According to my invention, I provide means whereby an abnormal demand upon any feeder circuit causes a suitable resistance to be inserted between the generating units and the distributing bus-bar, after which, the overloaded feeder circuit is disconnected and the resistance excluded from the circuit.

Another feature of my invention is the use of series transformers in connection with the various relay and trip coils of the system, whereby the greater the demand upon the system, the more reliable and positive is the action of the said auxiliary coils.

The single figure of the accompanying drawing is a diagrammatic view of a system of electrical distribution which embodies my invention.

Referring to the accompanying drawing, a single-phase alternating-current generator 1, having a connection to ground at G and a field magnet winding 2 which is connected to a suitable source of energy (not shown) supplies energy to a distributing bus-bar or conductor 3, through the primary windings of a plurality of series transformers 4 and 5 and a resistor 6 of large current-carrying capacity, which is adapted to be short-circuited by a circuit breaker 7, under normal operating conditions.

The distributing bus-bar 3 is connected to a plurality of feeder circuits 9, 10 and 11, through automatic overload circuit breakers 12, 13 and 14, respectively. The feeder circuits 9, 10 and 11 respectively include the primary windings of series transformers 15, 16 and 17, the secondary windings of which are adapted to energize relay coils, 18, 19 and 20.

The relay coils 18, 19 and 20 are respectively provided with a plurality of switch members 21, 22, 23, and 24, 25, 26, and 27, 28, 29, which are adapted to bridge stationary contact terminals 30, 31, 32, and 33, 34, 35, and 36, 37 and 38, respectively, under normal operating conditions.

The circuit breakers 7, 12, 13 and 14 are of like construction, except that the circuit breaker 7 is provided with a closing coil 40, which is connected to the secondary winding of a shunt transformer 41, through the switch members 23, 26 and 29. Circuit breaker 7 is also provided with an auxiliary switch 43, which establishes a short-circuit for the secondary winding of the series transformer 4 when said circuit breaker is in its closed position.

Each of the above mentioned circuit breakers comprises a bridging member 45 which is pivotally supported at 46, a spring 47 for moving said member away from the stationary contact terminals, a latch 48 for retaining said member in its closed position under the action of a spring 49, and a trip coil 50, the movable core of which is provided with a hammer rod 51 which is adapted to withdraw the latch 48 from the member 45 when the coil is sufficiently energized, as will be readily understood.

The circuit breakers hereinbefore described form no part of my invention, except as they perform necessary functions in the operation of the system, and may, therefore, be replaced by any other suitable means for accomplishing the same purposes. It is also evident that circuit breakers 12, 13 and 14 may be provided with suitable resetting devices (not shown) or may be manually operated, as desired.

Under normal operating conditions, the secondary winding of the series transformer 5 is in a closed circuit which includes the switch members 22—31, 25—34 and 28—37, and the secondary winding of the series transformer 4 is similarly included in a closed circuit through the switch 43.

The operation and circuit connections for the system are as follows: Assuming that the switching devices and circuit breakers occupy the positions shown in the drawing, and that the feeder 10 is accidentally grounded, so that a short-circuit occurs on said feeder, energy will be immediately supplied from the bus-bar 3, through the primary winding of series transformer 16, to ground. It is evident that, if the current traversing the secondary winding of the series transformer 16 exceeds a predetermined amount, the relay coil 19 becomes energized and disengages the switch members 24, 25 and 26 from the respective stationary contact terminals 33, 34 and 35.

As switch member 25 is disengaged from its terminals 34, the closed circuit which includes the secondary winding of the transformer 5 is interrupted, and the secondary current all flows through the trip coil 50. The energized coil 50 causes the hammer rod 51 to engage the latch 48 and thus release the circuit breaker 7, as will be readily understood, thereby inserting resistor 6 in circuit between the generator 1 and the bus-bar 3. The object of inserting resistance into the circuit is to cut down the excessive current to such a value as may be handled by the feeder circuit breakers without injurious results.

When the circuit breaker 7 is opened, it opens the switch 43, and thus compels the secondary current of the series transformer 4 to flow through conductor 55, switch members 27 and 36, conductor 56, conductor 57, trip coil 50 of the circuit breaker 13, conductor 58, conductor 59, switch members 21 and 30, and conductor 60. The trip coil 50 of the circuit breaker 13 being thus energized, causes said circuit breaker to disconnect the feeder circuit 10 from the bus-bar 3.

The disengagement of switch member 26 from stationary contact terminals 35, which is caused by the energization of relay coil 19, interrupts a circuit from the shunt transformer 41, through the closing coil 40 of the circuit breaker 7, and said coil is thereby deënergized. Inasmuch as the interruption of the above-mentioned circuit is concurrent with the release of the circuit breaker 7, the action of the spring 47, in opening said breaker, is not opposed by the closing coil 40.

It is evident that, as the feeder 10 is disconnected, the current traversing the series transformer 16 is discontinued, and the switch members 24, 25 and 26 of the relay coil 19 are allowed to drop and bridge their respective stationary contact terminals. Upon the closure of switch member 26 on the contact terminals 35, a circuit is completed from one side of the shunt transformer 41, through conductor 61, switch members 23 and 32, conductor 62, switch members 26 and 35, conductor 63, switch members 29 and 38, conductor 64, closing coil 40 and conductor 65 to the other side of the transformer 41. The closing coil 40, being thus energized, closes the circuit breaker 7 and short-circuits the resistor 6. Simultaneously with the closure of circuit breaker 7, circuit of the secondary winding of the series transformer 4 is closed upon itself, through the switch member 43, and normal operating conditions are restored.

While I have described and illustrated a system of electrical distribution having specific circuit connections, it is evident that many modifications of said circuit connections and structural details of the devices for arranging said circuits may be made without departing from the spirit and scope of my invention.

I claim as my invention:

1. The combination with a source of energy, a distributing bus-bar, a resistor connected between the source of energy and the bus-bar, means for short-circuiting said resistor under normal operating conditions, a plurality of feeder circuits, and a separate circuit breaker for each feeder circuit, of a plurality of series transformers between said source and said bus-bar, an auxiliary source of energy, a plurality of interlocking auxiliary circuits for supplying energy to said feeder breakers and said short-circuiting means from said transformers and said auxiliary source, and relays for controlling said interlocking circuits for causing an abnormal demand upon any feeder circuit to effect the insertion of the resistor into circuit, the disconnection of the feeder circuit supplying the abnormal demand, and the exclusion of the resistor from its circuit in a predetermined order.

2. The combination with a source of energy, a distributing bus-bar, a resistor connected between the source of energy and the bus-bar, means for short-circuiting said resistor under normal operating conditions, a plurality of feeder circuits connected to said bus-bar, and an independent circuit breaker for each feeder circuit, of a series transformer and connected relay associated with each feeder circuit, a series transformer in circuit with said resistor for energizing the trip coil of the circuit breaker of any overloaded feeder, a second series transformer in circuit with said resistor for causing said short-circuiting means to insert said resistor in circuit under abnormal conditions on any feeder, and a shunt transformer for causing said resistor to be short-circuited by said short circuiting means after the over-loaded feeder is disconnected.

3. The combination with a source of energy, a distributing bus-bar, a resistor connected between the source of energy and the bus-bar, an electrically operated circuit breaker adapted to short circuit said resistor under normal conditions, a plurality of feeder circuits connected to said bus-bar, and a circuit breaker for each feeder circuit, of an auxiliary series transformer connected in each feeder circuit, a relay coil having a plurality of switch members associated with and adapted to be energized by each series transformer under predetermined conditions, and three auxiliary control circuits which interlock with a switch member of each relay coil and are respectively adapted to independently energize the closing coil and the trip coil of said electrically operated circuit breaker and the trip coil of any or all of said feeder circuit breakers under predetermined conditions.

4. The combination with a source of energy, a distributing bus-bar, a plurality of feeder circuits connected to said bus-bar, and a circuit breaker for each feeder circuit, of an auxiliary series transformer connected in each feeder circuit, a relay coil adapted to be energized by each of said transformers under predetermined conditions, a switch member associated with each relay coil, an auxiliary control circuit interlocked with each of said switch members, and a trip coil associated with each feeder circuit breaker and connected in multiple to the switch member of each relay coil.

5. The combination with a source of energy, a plurality of feeder circuits, a resistor connected between said feeder circuits and said source, and an electrically operated circuit breaker normally short-circuiting said resistor, of a plurality of independent circuit breakers for said feeder circuits, electro-responsive relays severally associated with said feeder circuits, and means including a plurality of transformers having circuits severally interlocked with all of said electro-responsive relays and severally adapted, under abnormal circuit conditions on any feeder circuit, to control the opening of said short-circuiting breaker, the opening of the breaker of the overloaded feeder circuit, and the closure of said short-circuiting breaker.

6. The combination with a source of energy, a plurality of working circuits normally connected thereto, and means for inserting resistance between said working circuits and said source, of means dependent upon predetermined overload of any of said circuits for actuating said resistance-inserting means, means coöperating with said second means for disconnecting the overloaded circuit, and additional means coöperating with said first means for again actuating said resistance-inserting means.

7. The combination with a source of energy, a plurality of working circuits, a resistor connected between said source and said circuits, and a circuit breaker normally in multiple circuit therewith, of means dependent upon abnormal demand on any working circuit for opening said circuit breaker, means coöperating with said means for selectively disconnecting the overloaded working circuit, and separate means coöperating with said first means for closing said breaker subsequent to the action of said disconnecting means.

8. In a distributing system, the combination with a source of energy, a plurality of feeder circuits, a resistor in circuit between said feeder circuits and said source, a main electrically operated circuit breaker for short circuiting said resistor under normal conditions and separate electrically tripped circuit breakers in the several feeder circuits, of a plurality of energizing circuits for severally controlling the opening of said main breaker, the opening of said feeder breakers and the closure of said main breaker, and a plurality of relay switches severally responsive to circuit conditions of said feeder circuits and each adapted to make and break all of said energizing circuits.

9. In a distributing system, the combination with a source of energy, a plurality of feeder circuits, a resistor in circuit between said feeder circuits and said source, a main electrically operated circuit breaker for short circuiting said resistor under normal conditions, and separate electrically tripped circuit breakers in the several feeder circuits, of relay coils severally responsive to circuit conditions of the several feeder circuits, a plurality of interlock switches associated with each relay coil, and a plurality of energizing circuits severally interlocked through a switch of each relay and severally adapted to supply energy to trip said main breaker and said feeder breakers.

10. The combination with a source of energy, a plurality of feeder circuits connected thereto, and a circuit breaker having a trip coil for each feeder circuit, of an electro-responsive relay associated with each feeder circuit, a switch associated with each relay and adapted to short-circuit the trip coil of the corresponding feeder breaker, and an energizing circuit interlocked with each of said relay switches.

11. In a distributing system, the combination with a source of energy, a plurality of feeder circuits, a resistor in circuit between said feeder circuits and said source, a main circuit breaker for short-circuiting said resistor under normal conditions and adapted to be electrically opened and closed, and a plurality of electrically tripped circuit breakers in the several feeder circuits, of an electro-responsive relay associated with each feeder circuit and having a plurality of switches actuated thereby, and a plurality of energizing circuits each interlocked through a switch of each relay for severally supplying energy to respectively effect the opening of said main circuit breaker, the opening of any feeder breaker and the closure of said main circuit breaker.

In testimony whereof, I have hereunto subscribed my name this 18th day of August, 1910.

FORD W. HARRIS.

Witnesses:
C. W. McGhee,
R. J. Dearborn.